United States Patent [19]

Hamilton

[11] Patent Number: 5,041,932
[45] Date of Patent: Aug. 20, 1991

[54] INTEGRATED MAGNETIC READ/WRITE HEAD/FLEXURE/CONDUCTOR STRUCTURE

[75] Inventor: Harold J. Hamilton, Santa Clara, Calif.

[73] Assignee: Censtor Corp., San Jose, Calif.

[21] Appl. No.: 441,716

[22] Filed: Nov. 27, 1989

[51] Int. Cl.⁵ .................. G11B 5/105; G11B 5/127
[52] U.S. Cl. .................................. 360/104; 360/126
[58] Field of Search ............. 360/103, 104, 126, 121, 360/122

[56] References Cited

U.S. PATENT DOCUMENTS

| | | | |
|---|---|---|---|
| 3,805,290 | 4/1984 | Thompson | 360/103 |
| 3,864,748 | 2/1975 | Herdman et al. | 360/102 |
| 4,028,734 | 6/1977 | Mos | 360/104 |
| 4,131,924 | 12/1978 | Behr et al. | 360/106 |
| 4,167,765 | 9/1979 | Watrous | 360/103 |
| 4,245,267 | 1/1981 | Herman | 360/104 |
| 4,363,045 | 12/1982 | Herman | 360/104 |
| 4,422,115 | 12/1983 | Spash | 360/104 |
| 4,423,449 | 12/1983 | Hasegawa | 360/106 |
| 4,456,936 | 6/1984 | Steen et al. | 360/104 |
| 4,535,374 | 8/1985 | Anderson et al. | 360/103 |
| 4,654,737 | 3/1987 | Hopkins et al. | 360/106 |
| 4,703,375 | 10/1987 | Chan et al. | 360/105 |
| 4,703,376 | 10/1987 | Edwards et al. | 360/105 |
| 4,739,431 | 4/1988 | Yasuda et al. | 360/126 |
| 4,811,140 | 3/1989 | Enami et al. | 360/104 |
| 4,949,207 | 8/1990 | Lazzari | 360/126 |

OTHER PUBLICATIONS

"Dampled Head Arm", Norwood, IBM Tech Disc Bull, vol. 21, No. 8, Jan. 1979, p. 3093.

*Primary Examiner*—Robert S. Tupper
*Attorney, Agent, or Firm*—Kolisch, Hartwell, Dickinson, McCormack & Heuser

[57] ABSTRACT

An integrated head/flexure/conductor structure for the reading and writing of information with respect to a relatively moving medium, such as a disk or drum, and a method for manufacturing the same. The proposed structure takes the form of a micro-dimension, elongate, dielectric flexure body, and embedded within such body both magnetic read/write pole structure, and electrical coil and conductor structure operatively associated with the pole structure. The flexure body and the embedded constituents are formed on an atom-by-atom basis utilizing one or more conventional material-deposition processes.

14 Claims, 4 Drawing Sheets

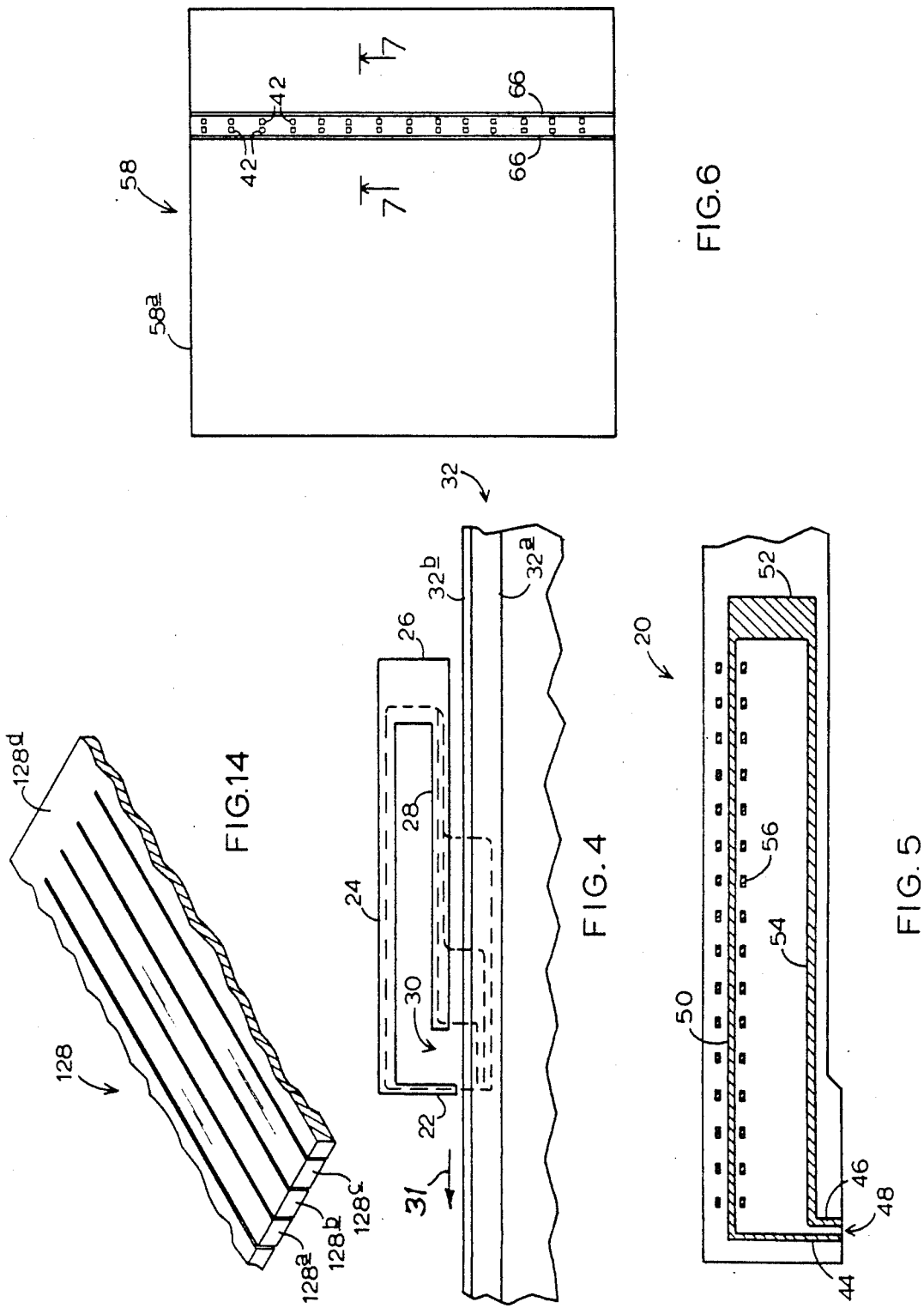

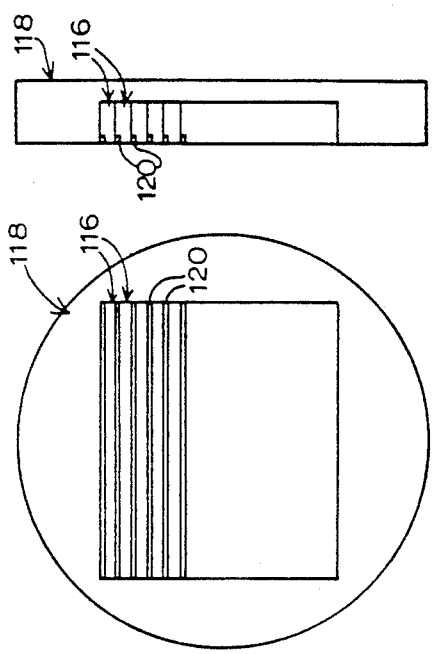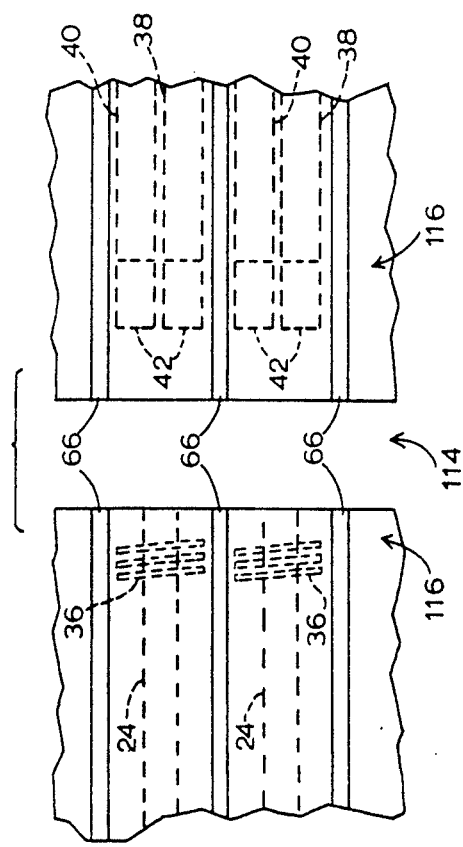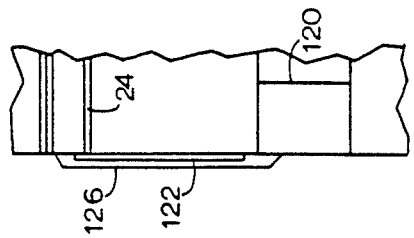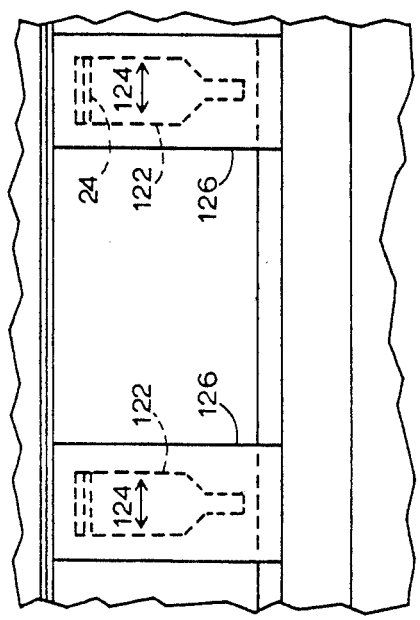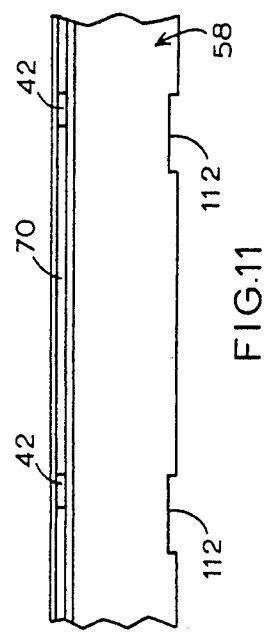

INTEGRATED MAGNETIC READ/WRITE HEAD/FLEXURE/CONDUCTOR STRUCTURE

BACKGROUND AND SUMMARY OF THE INVENTION

This invention relates to an electromagnetic read/write structure for the reading and writing of magnetic images on a relatively moving magnetic recording medium. More specifically, it relates to a unique, unitary, integrated read/write head/flexure/conductor structure of extremely small size, and to a method of making the same. In characterizing the size of the proposed structure, I think of the same as a micro flexhead.

While the structure of the invention may be used in a wide variety of applications, a preferred embodiment of the same is described herein in conjunction with reading and writing images with respect to rigid recording media, such as a disk or drum, in which application it has been found to have particular utility and to offer special advantages.

The performance of magnetic recording systems improves rapidly as the separation between the read/write head and the associated recording medium decreases. In rigid media systems, today, this separation is referred to as "flying height"—a reference relating to the fact that the conventional head, often referred to as a slider, is supported above the relatively moving medium surface by an air bearing. As the flying height is reduced, the risk of head wear, and in particular the potential for catastrophic wear or head "crash", increases rapidly. This problem may, of course, be minimized by proper selection of slider and medium surface materials relating to hardness, coefficient of friction, thermal conductivity, etc., and also by paying proper attention to the quality of the head/media interface, lubrication and the elimination of contaminants which may appear in that interface.

Nonetheless, in a typical system of this type currently, the head structure contacts the moving medium in the start and stop process, and occasionally in the operating mode, resulting, inevitably, in some degree of abrasive if not catastrophic wear. In general, wear rate is dependent upon surface velocity and applied pressure and, for a given velocity, increases slowly with pressure. However, at some point the wear rate rises steeply, resulting in some form of catastrophic wear.

One difficulty in understanding the wear process and in limiting wear, particularly in low flying heads on rigid media, is that the area of contact is frequently orders of magnitude smaller than that of the "footprint" of the slider. This is due to one or more of a variety of factors, such as roll and pitch dynamics, or the presence of a foreign particle in the head/medium interface. As a consequence, the transient local contact pressure, resulting from applied load plus inertial forces, may become extremely large. Looking at this situation a bit more closely, a key point is that such microscopic regions of contact are largely independent of the size and mass of the slider and, since reduction of the size and mass of the slider enables a corresponding reduction in the applied load and inertial forces, local contact pressure may be reduced accordingly.

Another reason for reducing the footprint of a slider as head/medium separation is reduced relates to the fact that slider roll or non-flatness of the medium or slider surface may cause the tip of the read/write pole to be abnormally separated from the medium.

Reducing the size, mass and applied load of a slider, of course, requires appropriate attention to the design of the air bearing of the slider, namely, a reduction of the slider's surface corresponding to the reduced applied load, in order to maintain the desired flying height. Also to be noted is the fact that the constraint on size and mass reduction of a slider with conventional designs lies in the practical limitations of fabricating slider bodies, air bearing rails and gimble-flexures mechanisms with appropriately small dimensions and tolerances, and mounting the sliders on flexures with correspondingly tight tolerances. Ultimately, the minimum size and mass is determined by the dimensions of the transducer, electrical conductors and supporting structure. Present sliders are one to two orders of magnitude larger in size than the transducer itself, and as much as three orders of magnitude larger in mass. Thus, in principle, the mass, and therefore the local contact pressure, could potentially be reduced by about three orders of magnitude, thereby greatly reducing abrasive wear, and perhaps also eliminating the possibility of a head crash.

In summary, major advances in the performance of medium magnetic recording systems may be achieved by further reducing head/medium separation—ultimately to continuous sliding contact. However, reducing head/medium separation, other things being the same, results in an increased abrasive wear, and in a greater risk of catastrophic wear. Since the area of contact between a slider and a medium is typically very small and relatively independent of the slider's macrodimensions, it should be possible to reduce greatly the size and mass of the slider, thus to enable a corresponding reduction in the applied and inertial forces and the local contact pressure, all resulting in greatly reduced abrasive wear and lower risk of catastrophic wear. Reduced footprint dimensions of a slider would also help to maintain small separation between the head and medium.

A general object of the present invention, therefore, is to provide a unique read/write structure which deals with each of the issues addressed above in a novel and extremely effective manner.

Specifically, an object of the invention is to provide a unique read/write structure which is orders of magnitude smaller in size and mass when compared with today's counterparts —a structure which is capable of non-catastrophic, continuous sliding contact interaction with the surface of a relatively moving recording medium.

Yet another object of the invention is to provide such a structure which is characterized by a unitary and totally integrated head/flexure/electrical conductor combination formed entirely, atom-by-atom, in a deposition process, e.g. by sputtering and photolithographic patterning of materials.

A further object is to provide a structure which easily allows for multiple-head arrays. Still another important object of the invention is to provide a novel method of manufacturing a read/write structure of the types just generally outlined.

These and other important objects and advantages which are attained by the invention will become more fully apparent as the description which now follows is read in conjunction with the accompanying drawings.

DESCRIPTION OF THE DRAWINGS

FIG. 4 is a simplified view illustrating the magnetic interaction which occurs between the head in the structure of FIGS. 1, 2 and 3 and magnetic layers of an associated, relatively moving, rigid recording medium (disk).

FIG. 5 is a fragmentary view, somewhat like that of FIG. 2, illustrating an alternative construction which includes a ring-type read/write head (transducer).

FIGS. 6–13, inclusive, illustrate steps in the manufacture of the structure of FIGS. 1, 2 and 3.

FIG. 14 (plate 2) is a fragmentary perspective (non-working side) view of a multiunit array of structures like the one shown in FIG. 1.

DETAILED DESCRIPTION OF THE INVENTION

Figure 1:
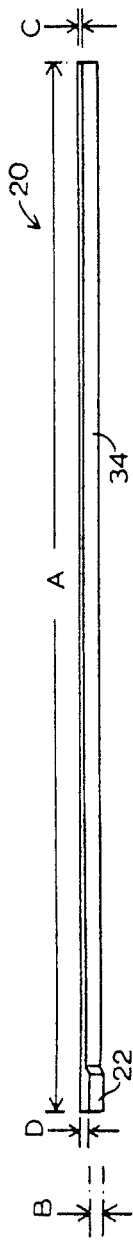
FIG. 1 is a working-side perspective (slightly rotated) view of a read/write structure constructed in accordance with the present invention.

Turning now to the drawings, and referring first of all to FIG. 1, indicated generally at 20, is a read/write head/flexure/conductor structure constructed in accordance with the present invention. Structure 20 herein has an overall length A of about 0.3-inches, and overall width B of about 0.006-inches, a thickness C along most of its length of about 0.001-inches, and a somewhat greater thickness D of about 0.002-inches forming an enlargement adjacent its left end in FIG. 1, which end may be thought of as the read/write working end of the structure.

The particular dimensions just given have been chosen because they work particularly well. However, I recognize that different specific dimensions, preferably generally near the ranges set forth below, can be used quite successfully.

A—0.2–0.5-inches
B—4–20-mils
C—15–60-microns
D—20–65-microns

Figure 2:
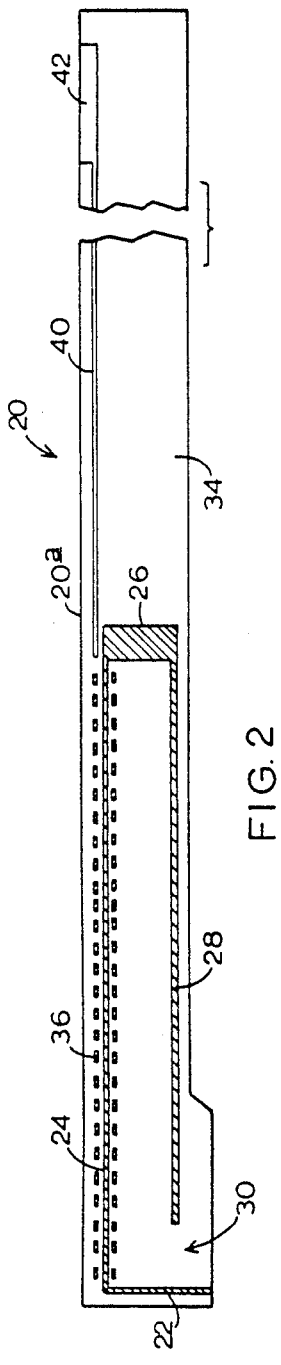
FIG. 2 is an enlarged longitudinal lateral cross section of the structure of FIG. 1 illustrating the integration therein of a probe-type head (transducer), an electrical coil and conductive traces connecting therewith, and an embedding flexure body.
Figure 3:
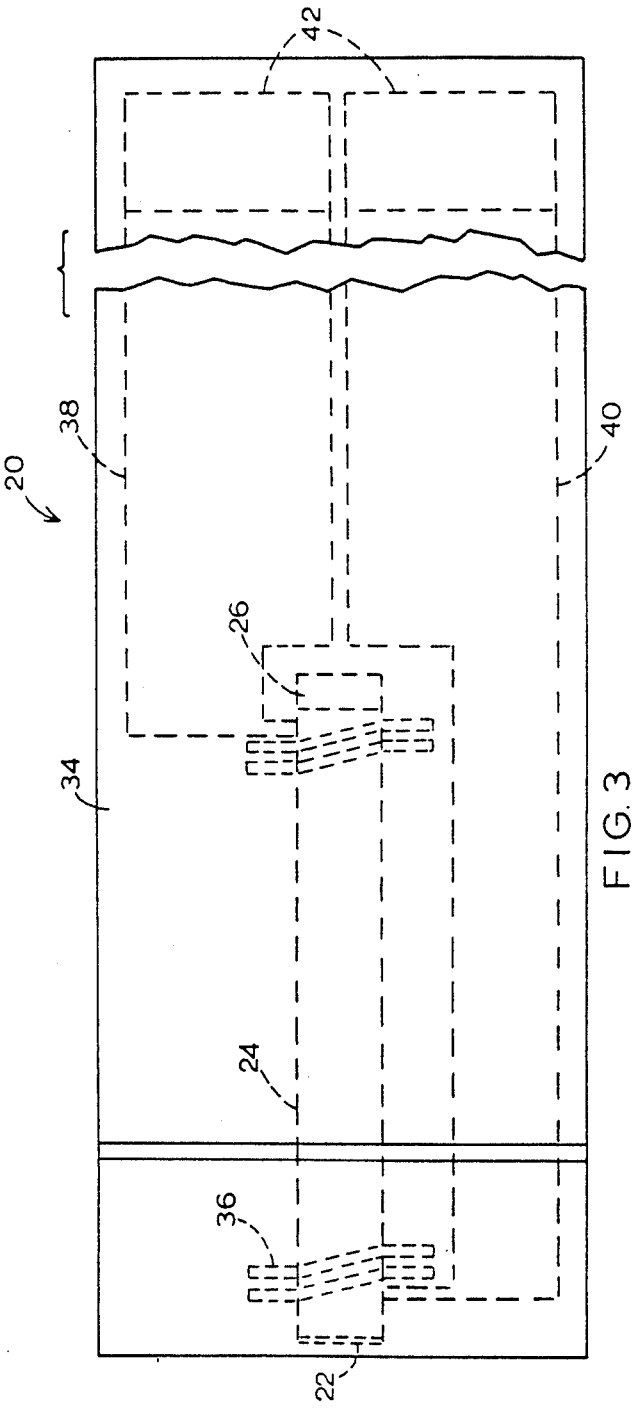
FIG. 3 is a plan view taken generally from the bottom side of FIG. 2.

Considering FIGS. 2 and 3 along with FIG. 1, the read/write structure now being described is formed with a probe-type head for perpendicular recording, with this head including a main pole 22, a yoke 24, a back-gap stud 26, and a flux-return yoke 28. These components are magnetically coupled to form a low-reluctance path, terminating in a high-reluctance gap 30 between main pole 22 and the end of return yoke 28. This return yoke may be made preferably somewhat wider than yoke 24 to provide a very large area of flux-coupling and a low reluctance path to the soft magnetic underlayer of the recording medium. With reference for a moment to FIG. 4, such a medium is shown generally at 32 including the just-referred-to soft magnetic underlayer 32a covered with a high-coercivity, perpendicularly oriented recording layer 32b. The direction of motion of medium 32 relative to the head is indicated by arrow 31.

The magnetic pole structure just generally described is formed in a manner which will be outlined later as a structure embedded within an elongate, dielectric flexure body 34 which is made herein, for example, of aluminum oxide. Other flexure-body materials, such as silicon dioxide, may also be used.

Inductively coupled to yoke 24 in structure 20 is a helix coil 36, also formed in a manner which will be described shortly, with the ends of this coil connecting through lead conductors 38, 40 to bonding pads 42.

Shifting attention for a moment to FIG. 5, here there is shown an alternative embodiment of the invention, wherein structure 20 includes a form of thin film, ring-type head for recording on longitudinally oriented media, i.e., with an easy axis of magnetization in this plane of the media. In this structure there are included poles 44, 46 which are relatively thick (in order to avoid pole tip saturation) with their lower extremities substantially coplanar so as to be in close proximity to the surface of an underlying recording medium.

Gap 48 which exists between these poles is made very small in order to afford good linear bit resolution in signal reproduction. It is this dimension which determines the linear bit resolution in signal reproduction. Most of the flux, produced by current flow in the helix coil, bridges directly across gap 48, with only a small part fringing out to the medium, thus limiting the field intensity in the record mode. For this reason, it is necessary to restrict the throat height of gap 48 (the space where poles 44, 46 confront and parallel one another) so as to cause more of the flux to encompass the medium. As a rule of thumb for thin-film, ring-type heads, the throat height is held to one or two times the gap thickness in order to provide sufficiently high field intensity for recording on high coercivity media. Thus, in current thin-film longitudinal recording heads, gap 48 may be about 0.5-micrometers, thereby enabling linear bit resolution of about 20,000-flux-reversals-per-inch, and restricting throat height to about 1-micrometer. Higher recording densities necessitate still more precise control of throat height in the lapping process.

In contrast, gap 30 in the probe type head is made relatively large so that very little flux in the magnetic circuit fringes across this gap. Consequently, virtually all of the flux from the tip of pole 22 is effective in magnetizing the recording layer in the medium, and there is no similar throat height restriction.

Thus, in practice, the height of pole 22 is routinely made about 5- to about 10-micrometers without deleterious effect on recording and reproducing performance, though pole tip saturation may become a problem as pole thickness is reduced below about 0.5- micrometers. From this analysis, it will be apparent that probe head recording on two-layer perpendicular media offers great advantage over thin-film ring-head recording on longitudinal media in regard to the ease of head manufacture and tolerance for head wear as head-media separation is reduced, ultimately to continuous sliding contact.

The remainder of the magnetic structure shown in FIG. 5 includes a yoke 50, a back-gap stud 52, and a return yoke 54. Inductively coupled to yoke 50 is a helix coil 56 which is similar to previously mentioned coil 36. The ends of coil 56 (not shown) connect to appropriate bonding pads, like pads 42, through connecting conductors, like previously mentioned conductors 38, 40.

Those skilled in the art and familiar with probe-type heads (FIG. 2) and ring-type heads (FIG. 5) will understand the magnetic-circuit design constraints which must be observed in order to have satisfactory head performance. Accordingly, details of these constraints are not set forth in this description.

The unitary, integrated character of the read/write structures illustrated and discussed so far have been achieved in what might be thought of as an atom-by-atom construction process. One of the most important constituents of the present invention is that sputtered aluminum oxide (or other similar inorganic materials), which is used to form the main, elongate embedding flexure body for the entire structure, is characterized by a high degree of elasticity and structural integrity. This characteristic plays a significant role in the ability to offer such a small-dimension (micro), low-mass (for example, about 100-micrograms) read/write structure. The structures shown herein are so significantly reduced in size and mass, that experience has shown that they can be used for direct, continuous, sliding contact operation with a recording medium, virtually free from catastrophic wear.

Considering now the method of manufacture proposed herein for building structures like those illustrated, this method will be described in conjunction with the making of the unit shown in FIGS. 1–3, inclusive.

As has been mentioned, a key feature of the present invention—one which marks a fundamental departure from conventional practice in the fabrication and assembly of heads, flexures and electrical connections, lies in the fact that the entire microhead/flexure/connector complex is fabricated as an integral unit, utilizing thin-film and photolithographic technology which is widely known by those skilled in the art. Put another way, the entire structure of the present invention is fabricated atom-by-atom employing conventional thin-film deposition and etching processes, e.g., sputtering, vapor deposition, plating, chemical vapor deposition, ion beam deposition and etching, etc., accompanied by well known photo-patterning of the magnetic, electrical and structural parts.

The magnetic head structure employed herein, becomes, in a sense, an extension of the thin-film reed flexure, and is of comparable thickness. Employment of a helical coil structure winding around a magnetic yoke enables a very significant reduction in the physical width of the overall head structure, and more significantly, in the inductance and resistance of the head and corresponding cross-talk sensitivity. Thin-film deposition of the electrical leads within the flexure structure eliminates the need for bonding twisted-pair conductors as is required in conventional current practice.

Figure 7:
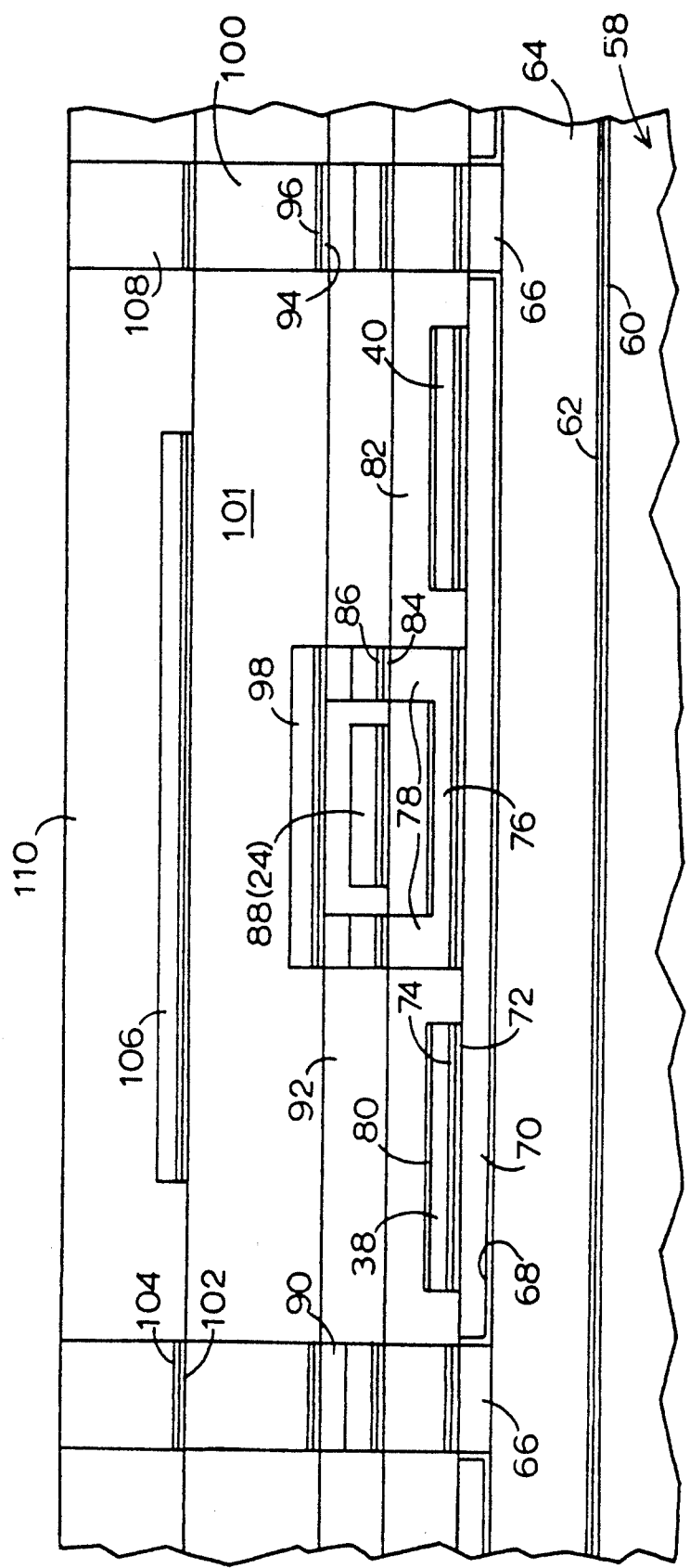

In FIG. 6., a square wafer 58, which may be a polished flat wafer of silicon or ceramic, e.g. barium titanate, serves as a substrate for the deposition and patterning of all material which makes up structure 20 in FIGS. 1, 2 and 3. FIG. 7 is a fragmentary section view taken generally along line 7—7 in FIG. 6, illustrating the various layers that are formed during the construction process to make up read/write structure 20. With respect to the way in which structure formation takes place during the manufacturing process herein, the upper surface 20a in the structure (see FIG. 2) is what is formed first, and is the portion of the structure which lies most closely adjacent the upper surface of wafer 58 in FIG. 6.

Thin films of titanium 60 and copper 62 are sputtered onto the upper surface of wafer 58, with the former serving as an adhesion layer, and the latter as an electrically conducting electro-plating base. A copper layer 64, about 5- to about 25-micrometers thick, is electroplated over film 62, and polished flat to a smooth, bright finish. Photoresist is then patterned, forming a mask through which additional copper is plated to a thickness of about 6- to about 10-micrometers to result, after stripping of the photoresist, in the parallel copper stripes 66.

Photoresist is now patterned with reference to edge 58a (see FIG. 6) of wafer 58, and about 6- to about 10-micrometers of gold is plated through this pattern to form previously mentioned bonding pads 42 (not shown in FIG. 7). A titanium adhesion layer 68 is then sputtered over this surface, followed immediately by sputtering of an aluminum oxide layer 70 to a thickness of about 6- to about 10-micrometers. The resulting surface is now lapped and polished to expose stripes 66 and bonding pads 42, and to form a smooth, plane surface.

Next, a titanium adhesion layer 72 and a plating base 74 are sputtered over this surface, and photoresist is patterned through which about 2- to about 4-micrometers of copper are plated, thereby forming the bottom conductors 76 of previously mentioned helix coil 36. Referred to with respect to FIG. 7 as the bottom conductors of the helix coil, these appear as the top conductors in the coil as illustrated in FIG. 2. This same layer forms previously mentioned conductors 38, 40, and gives added height to stripes 66. Photoresist is then stripped, and again formed and patterned to enable subsequent plating of copper several micrometers thick through the photoresist mask to form, after etching exposed parts of plating base 74 and titanium layer 72, electrical via connections 78, as well as additional copper on top of stripes 66. A titanium adhesion layer 80 is then sputtered onto the surface, and subsequently etched through a photoresist mask to isolate, electrically, conductors 38, 40, all vias 78, and coil conductors 76. Next, an aluminum oxide film 82 is sputtered to a thickness of several micrometers, and lapped and polished to expose vias 78 and stripes 66, and again form a smooth, plane surface.

Following this, another titanium adhesion layer 84 and a nickel-iron plating base 86 are sputtered. Thereafter, a nickel-iron permalloy layer 88 is electroplated through a photoresist mask, and in the presence of a strong magnetic field, to a thickness of about 2- to about 3-micrometers thick, to form previously mentioned yoke 24 with a transverse easy axis of magnetization. This step also extends the heights of vias 78 and stripes 66.

It should perhaps be noted that the magnetic components in structure 20 may be made from various alternative materials, e.g., cobalt-iron, cobalt-zirconium, iron-nitride, etc., and by various alternative deposition means, e.g., sputtering, vapor deposition, chemical vapor deposition, etc.

Photoresist is now stripped and a new photoresist mask is created, through which nickel-iron layer 90 is plated about 4- to about 6-micrometers thick, and again in an appropriate magnetic field, on top of vias 78 and stripes 66, forming the base of previously mentioned back-gap stud 26. The exposed areas of layer 84 and base 86 are etched away, and about 6- to about 8-micrometers of aluminum oxide, layer 92, is sputtered over the surface and again lapped and polished to a plane surface, exposing vias 78, the back-gap stud, and stripes 66. It should be noted that the thickness of flexure body 34, formed of aluminum oxide, is gradually increasing in this sequence of depositions, and that the width of the flexure body is limited by the spacing between stripes 66.

A titanium adhesion layer 94 and a copper plating base layer 96 are sputtered on the now exposed surface, and about 2- to about 4-micrometers of copper are plated through a photoresist mask, thereby to form conductors 98 which interconnect vias 78 and complete the fabrication of the helix coil, and the connection to the heretofore isolated conductors 38, 40. After then stripping the photoresist mask just used, a new thick photoresist mask is prepared, through which about 20- to about 30-micrometers of nickel-iron, layer 100, is plated in a magnetic field to form back-gap stud 26, and also to add height to stripes 66. The exposed areas of films 94, 96 are etched away after stripping the photoresist, and about 35- to about 40-micrometers of aluminum oxide, layer 101, is sputtered over the surface. The surface is again lapped and polished flat, exposing back gap stud 26 and stripes 66. A titanium adhesion layer 102 and a nickel-iron plating base 104 are sputtered to enable a nickel-iron film 106, about 2- to about 4-micrometers thick, to be plated in an appropriate magnetic field in a photoresist mask to create previously mentioned return yoke 54. This photoresist mask is then stripped and replaced with a new mask, through which about 15- to about 20-micrometers of nickel-iron, layer 108, is plated on top of stripes 66. The exposed areas of layers 102, 104 are etched away, and about 15- to about 20-micrometers of aluminum oxide, layer 110, is sputtered into place, after which it is lapped flat to expose stripes 66. Finally, the surface of aluminum oxide is etched through a photoresist mask to a depth of about 10- to about 15-micrometers, thereby to define the thickness of flexure body 34 with the enlargement or step in the surface topography which is present in the region of gap 30. This etching step also partially exposes the sides of stripes 66.

Scribe cuts 112, about 50- to about 100-micrometers deep, and about 100- to about 150-micrometers wide, are made on the back side of wafer 58 with reference to edge 58a, thereby creating a shallow notch opposite bonding pads 42, as is shown in FIG. 11. Saw cuts 114 are now made, dividing wafer 58 into bars 116, exposing the ends of yoke 24, as shown in FIG. 8, but not exposing bonding pads 42 or conductors 38, 40. Bars 116 are assembled and held in a fixture 118 (see FIGS. 9 and 10) with epoxy 120, with the ends of yokes 24 exposed and co-planer with the surface of fixture 118. The epoxy fills previously mentioned notches, or scribe cuts, 112.

The surface of this assembly is then lapped and polished flat. After cleaning, a soft magnetic film 122 (see FIGS. 12 and 13), having a high saturation magnetization, is sputtered to the desired thickness of previously mentioned pole 22 in the presence of a strong magnetic field so that the easy axis of magnetization is parallel to the lengths of bars 116, as indicated by arrows 124 in FIG. 12. Film 122 is then patterned, preferably by ion milling through a photoresist mask, to form previously mentioned poles 22 which join with the exposed ends of yokes 24, as shown in FIGS. 12 and 13. A passivation layer 126 of aluminum oxide, about 2- to about 4-micrometers thick is sputtered over the surface. Photoresist is patterned and layer 126 is etched, leaving aluminum oxide covered poles 22 as seen in FIGS. 12 and 13. Fixture 118 is then immersed in a solvent to dissolve the epoxy and to free bars 116. The bars are then immersed in an etch bath which dissolves the copper and nickel-iron in stripes 66, and copper layer 64 underneath the flexure body 34, thereby completing the fabrication of the structure of the invention. Finally, run-in lapping serves to expose the tip of pole 22.

Shifting attention now from the process of manufacture proposed herein to yet another structural implementation of the invention, and directing attention specifically to FIG. 14, here there is shown, fragmentarily and generally at 128 a multihead array of individual, independently flexible, head/flexure/conductor structures arranged as fingers, such as those shown at 128a, 128b, 128c, which extend from and are joined through a common support base indicated generally at 128d. Each of these finger-like structures, except where the same joins with base 128d may have the same internal construction as either of the structures shown in FIGS. 1 or 5.

Except with respect to the fact that a common support base is included in such an array, and that photo-patterning must take into account the multiplicity of joined structures, the manufacturing technique employed here is substantially the same as that just described above.

It should thus be apparent that a strikingly unique, integrated, unitary head/flexure/conductor structure, as well as arrays of such structures, and a unique method of making the same, are disclosed herein which deals significantly with the size and mass problems that attend use of current read/write structures. The structure of the present invention can be used in direct, continuous contact with the surface of a relatively moving medium without any appreciable tendency to produce damaging wear.

Greatly reduced mass is, of course, the key to the present invention's ability to offer this kind of performance. In each of the embodiments described hereinabove, the volume of identified magnetic material (computed from the formation dimensions set forth) contributes a mass of about 1.5-micrograms, and the volume of copper (likewise computed) making up the conductive structure contributes about 30-micrograms. Given these contributions to mass, and considering the ranges of dimensions set forth earlier in the text, and with the identified, proposed dielectric material each having known density of about 4-grams-per-cubic-centimeter, the overall mass of the smallest proposed head/flexure/conductor structure is about 60-micrograms, and that of the largest suggested structure is about 1.5-milligrams.

While a preferred embodiment and method of practicing the invention have been disclosed, with two alternative pole structures illustrated, and an array model illustrated, other variations and modifications may certainly be made without departing from the spirit of the invention. It will be apparent also that alternative materials and deposition and patterning processes may likewise be employed within the scope of the invention.

I claim:
1. An integrated, unitary read/write head/flexure/conductor structure for the reading and writing of information with respect to a relatively moving medium, such as a disk or drum, said structure comprising
   an elongate dielectric flexure body, and
   embedded within said body, a magnetic read/write head including pole means, and electrical coil and conductor means operatively associated with said pole means,
   said structure having a mass less than about 1.5-milligrams.

2. The read/write structure of claim 1 wherein said pole means comprises a probe type main pole in conjunction with an auxiliary or flux return pole for recording on two-layer media whose easy axis of magnetization is normal to the plane of the media.

3. The read/write structure of claim 1, wherein said pole means has a gapped two-pole or "ring" type configuration as utilized conventionally for recording on media whose easy axis of magnetization is in the plane of the media.

4. The read/write structure of claims 1, 2 or 3, wherein said flexure body is formed of aluminum oxide.

5. The read/write structure of claims 1, 2 or 3 which has an overall length in the range of about 0.2- to about 0.5-inches, an overall width in the range of about 4- to about 20-mils, and a thickness in the range of about 15- to about 65-microns.

6. The read/write structure of claim 6 which has an overall length in the range of about 0.2- to about 0.5-inches, an overall width in the range of about 4- to about 20-mils, and a thickness in the range of about 15- to about 65-microns.

7. An integrated, unitary read/write/head/flexure/conductor structure for the reading and writing of information in sliding contact with a relatively moving recording medium, such as a disk or drum, said structure comprising an elongate dielectric flexure body, and
embedded within said body, a magnetic read/write head including pole means, and electrical coil and conductor means operatively associated with said pole means,
said structure having a mass less than about 1.5-milligrams.

8. The read/write structure of claim 7, wherein said flexure body is formed of aluminum oxide.

9. The read/write structure of claim 7, which has an overall length in the range of about 0.2- to about 0.5-inches, an overall width in the range of about 4- to about 20mils, and a thickness in the range of about 15- to about 65-microns.

10. The read/write structure of claim 8 which has an overall length in the range of about 0.2- to about 0.5-inches, an overall width in the range of about 4- to about 20-mils, and a thickness in the range of about 15- to about 65-microns.

11. An integrated, unitary read/write head/flexure/conductor structure for the reading and writing of information with respect to a relatively moving medium, such as a disk or drum, said structure comprising plural elongate dielectric flexure bodies independently flexible relative to one another and joined to a common support base, and
embedded within each said body, a magnetic read/write head including pole means, and electrical coil and conductor means operatively associated with said pole means,
each said body and associated embedded elements having a combined mass less than about 1.5-milligrams.

12. The read/write structure of claim 11, wherein each pole means comprises a probe-type main pole in conjunction with an auxiliary or flux return pole for recording on two-layer media whose easy axis of magnetization is normal to the plane of the media.

13. The read/write structure of claims 11, wherein each pole means has a gapped two-pole or "ring" type configuration as utilized conventionally for recording on media whose easy axis of magnetization is in the plane of the media.

14. The read/write structure of claims 11, 12 or 13, wherein each flexure body is formed of aluminum oxide.

* * * * *

UNITED STATES PATENT AND TRADEMARK OFFICE
CERTIFICATE OF CORRECTION

PATENT NO. : 5,041,932

DATED : August 20, 1991

INVENTOR(S) : Harold J. Hamilton

It is certified that error appears in the above-identified patent and that said Letters Patent is hereby corrected as shown below:

Column 8, line 38, change "micrograms" to --milligrams--; line 43, change "material" to --materials-- and after "having" insert --a--.

Column 9, line 19, change "6" to read --4--.

Signed and Sealed this

Seventh Day of January, 1992

Attest:

HARRY F. MANBECK, JR.

*Attesting Officer*  *Commissioner of Patents and Trademarks*